United States Patent

Morris

[15] 3,688,047

[45] Aug. 29, 1972

[54] SWITCHING SYSTEM CHARGING ARRANGEMENT

[72] Inventor: Joel Morton Morris, Baltimore, Md.

[73] Assignee: Bell Telephone Laboratories, Incorporated, Murray Hill, Berkeley Heights, N.J.

[22] Filed: Aug. 31, 1970

[21] Appl. No.: 68,076

[52] U.S. Cl...............................179/7.1 R, 179/2 TV

[51] Int. Cl...............................H04m 15/18

[58] Field of Search...179/7 R, 7 MM, 7.1 R, 7.1 TP, 179/2 TV

[56] References Cited

UNITED STATES PATENTS 3,335,226 8/1967 Michael..........................179/2

FOREIGN PATENTS OR APPLICATIONS 926,972 4/1960 Great Britain...........179/7.1 R 926,973 4/1960 Great Britain...........179/7.1 R

OTHER PUBLICATIONS

Video Service for Business Bell Laboratories Record May/June 69 p. 149- 153 Choosing the Route Bell Laboratories Record May/June 69 p. 155- 159

*Primary Examiner*—Kathleen H. Claffy
*Assistant Examiner*—Thomas D'Amico
*Attorney*—R. J. Guenther and James Warren Falk

[57] ABSTRACT

A switching system operable to establish a communication path comprising a video connection and an audio connection between stations is arranged with apparatus operable to detect the enabling of either or both said connections and further operable to control billing equipment to record the completion and duration of each such connection. Upon answer of a calling connection by a conventional telephone, audio answer supervision is returned and a corresponding billing entry is made. If the calling connection is initially or subsequently answered from a station equipped for video the concurrent presence of an audio supervision signal and a video supervision signal enables logic circuitry in the associated trunk circuits which causes the video channel to be unblocked at the called office and a combined audio-video billing entry to be made at the calling office.

12 Claims, 7 Drawing Figures

INVENTOR
J. M. MORRIS
BY Brendan A. Ward
ATTORNEY

PATENTED AUG 29 1972 3,688,047

SHEET 4 OF 6

SWITCHING SYSTEM CHARGING ARRANGEMENT

BACKGROUND OF THE INVENTION

1. Field of the Invention

This invention pertains to communication systems operable to provide arbitrarily selectable communication features for selected intervals of time during the course of a particular connection and particularly to automatic charging arrangements within such systems.

2. Description of the Prior Art

At one time, communication systems were employed as a substitute for direct personal contact only where considerations such as physical distance so dictated. As society became more complex, communication systems, such as the telephone system, became an integral part of that society because of the substantial increase in the necessity of communication thereby imposed. Today, voice communication from one fixed location to another by telephone is considered as merely the more basic aspect of the service provided by telephone technology since numerous features have been provided as an adjunct to telephone service. For example, the interconnection of data equipment independent of the telephone apparatus may be provided upon establishment of the initial telephone connection.

It is, of course, obvious that all communication features beyond the basic voice communication path requires the provision and utilization of complex equipment with the result that a telephone subscriber is automatically charged a small additional premium for the use of the additional feature. In each such instance it is customary to levy this charge upon the calling station. Accordingly, selection of a particular feature is generally under control of the calling station (for example, see the call-transfer feature taught in the S. Kandel et al. U.S. Pat. No. 3,363,063 issued Jan. 9, 1968; see also the add-on feature taught in the M. E. Krom U.S. Pat. No. 3,320,367 issued May 16, 1967). Obviously, where the additional feature is under the exclusive control of the calling station, no problem prevails with respect to automatic charging and billing in view of the existence of well-known equipment operable to perform this function. (See U.S. Pat. No. 2,599,358 issued June 3, 1952 to H. D. Cahill et al.). However, numerous communication features require specific interaction between equipment at the calling station and the called station, or in the alternative require certain physical action to be taken at the called station which permits utilization of the communication feature which is intended to be enabled during the course of a given connection. This action may require nothing more than the activation of a switch which will enable auxiliary equipment associated with the called station. In any event, it has the effect of placing control of the extension of a given communication feature at the disposal of the called station as well as the calling station.

A classic example of such features in modern day communication systems is the provision of PICTUREPHONE service (see Bell Laboratories Record, May/June, 1969). In addition to the usual telephone apparatus necessary to provide an audio communication path, this feature requires the provision of apparatus to receive and transmit television signals via a video communication path to enable the called and calling stations to see as well as to hear each other.

Thus, upon initiating a PICTUREPHONE call the calling station usually prefixes a control digit to the called directory number to indicate that a PICTUREPHONE connection is to be established. The called station may be within the same central office as the calling station or may in fact be served by a central office many thousand miles away. In any event, the equipment in the originating office and the intermediate offices proceed to establish both an audio and a video connection forward to the called station. The called station is signaled in the conventional manner to indicate that a calling connection has been directed thereto. In the usual instance the call will be answered at the called station which is equipped with apparatus essentially identical to that at the calling station and as a result audio and video communication may thereupon ensue. However, it is well known in the art that telephone extensions are frequently provided which are auxiliary to the called PICTUREPHONE station. It is also well known in the art that a called station may be arranged to have incoming calls answered by an answer phone service which may not be equipped with video facilities. It is also well known in the art that a called station may have previously utilized the call transfer feature (see Kandel et al supra) whereby all incoming calls are automatically forwarded to an arbitrarily selected other telephone location which may not be provided with video facilities. Another example is the situation where an incoming call to a called station equipped with video at an office or business location is initially answered by a secretary or clerk from an extension station not equipped with video facilities. An additional example is where the video apparatus at the called station is not operative either because of the desire of the called party of avoid visual communication temporarily or because of malfunctioning of the video apparatus.

In each of the above described instances, answer by the called station or another station associated therewith results in commencement of the charging rate established for the particular service which the calling station initiated. This charging is accomplished generally at the calling central office. However, it is obvious that where the particular service the calling station has selected is in fact not provided because of any one of the conditions above described, or for similar reasons, the calling station is placed in a position where it is being charged for a feature which is not being provided as intended.

Thus, a need exists in the art for a charging arrangement for communication systems which is operable to detect and to recognize that, although a calling station has directed that a particular communication feature be provided, in fact such feature has not been provided because of circumstances existing at the called station.

It is also to be noted that, although a particular communication feature may not be enabled upon answer at a called station, it may in fact be subsequently enabled during the course of the call. Thus, for example, although a call may be initially answered from a residence extension telephone, the called party may desire to utilize video service and may thereupon utilize the main station location which includes the necessary video apparatus.

Therefore, a need also exists in the art for an automatic arrangement which is operable to recognize not only the initial answer associated with a basic communication path but which is also operable to detect and to recognize the subsequent enabling of equipment or apparatus operable to provide additional features and to arrange to thereupon appropriately charge the calling station for the interval of use of such features during the course of a calling connection.

SUMMARY OF THE INVENTION

In the exemplary embodiment, a communication system is provided which is operable to concurrently provide a video connection and an audio connection between stations. The communication system comprises an originating and a terminating office each equipped with dual switching networks operable to provide the video communication path and the audio communication path, respectively. The audio path includes a two-wire bi-directional transmission path while the video path comprises a four-wire transmission path with each pair of wires being used for transmission in opposing directions. The video switching networks at each office are equipped with video trunks which are operable to function in a two way capacity dependent upon the direction of the call. In similar fashion the audio switching networks at each office are equipped with audio trunks arranged to function in either direction dependent upon the direction of the call.

In the embodiment, a detector circuit is associated with each of the two video trunks involved in a particular call. In its quiescent state, the detector circuit is arranged to block the transmission and reception of video information which might otherwise occur over the video trunk transmit and receive pairs. Upon establishment of the respective audio and video connections through to the called station in the well known prior art manner, ringing is impressed upon the audio path to the called telephone apparatus. The audio trunk is arranged to recognize answer by the called station telephone and to transmit answer supervision back to the calling audio trunk which, in turn, transmits this information to the detector circuit associated with the calling video trunk. Concurrently therewith, the answer by the called station telephone is also recognized by the detector circuit associated with the video trunk at the called office.

A video supervisory signal is thereupon transmitted to the called station video equipment in the well-known manner by the called video trunk. If the video connection is completed through to operable video apparatus at the called station, the called video apparatus responds in the well-known manner by transmitting a video synchronizing signal. Where in fact this occurs, the detector circuit associated with the video trunk in the called office recognizes and utilizes this signal in conjunction with the previously detected audio supervision signal to enable logic circuitry within the detector circuit.

The logic circuitry causes the unblocking of the transmit and receive pairs in the video trunk at the called office thus completing the video communication path which extends from the calling station through the calling network and the called network to the called station. The transmitted video synchronizing signal from the called video apparatus is thereupon recognized by the detector circuit associated with the calling video trunk and in conjunction with the previously detected answer supervision indication from the audio trunk results in the enabling of logic circuitry in the detector circuit. As a result, the automatic message accounting equipment is enabled at the calling office to cause the imposition of a charging rate suitable for a connection which comprises both a completed audio and a completed video communication path.

It may occur that the called station does not comprise video apparatus operable to extend the calling video communication path. For example, the call may be answered at an extension station not so equipped, or at an answering service not so equipped. When the call is not extended so as to complete the video communication path, only the audio supervision signal is returned to the calling office. Thus in the well known prior art manner, the automatic message accounting equipment is enabled for the purpose of charging only for the established audio path.

If the video communication path is later completed through to the called station by subsequent enabling of the called station video apparatus, this fact is recognized as above set forth, thereby causing the automatic message accounting equipment at the calling office to cause the initiation of a corresponding charge for the period during which the intended feature is utilized between the stations.

In accordance with one feature of my invention a switching system is arranged to recognize the completion and duration of the establishment of a basic communication path and is further operable to detect and to recognize the utilization of apparatus or equipment initially rendered operable to provide additional communication features.

It is a further feature of my invention that a switching system is arranged to detect and to recognize that, although a calling station has directed that a particular communication feature be provided, in fact such feature has not been provided because of circumstances existing at the called station and is further operable to control automatic message accounting equipment to reflect this fact.

BRIEF DESCRIPTION OF THE DRAWING

The foregoing objects, features, and advantages as well as others of my invention will be more apparent from the following description of the drawing in which.

Figure 1:
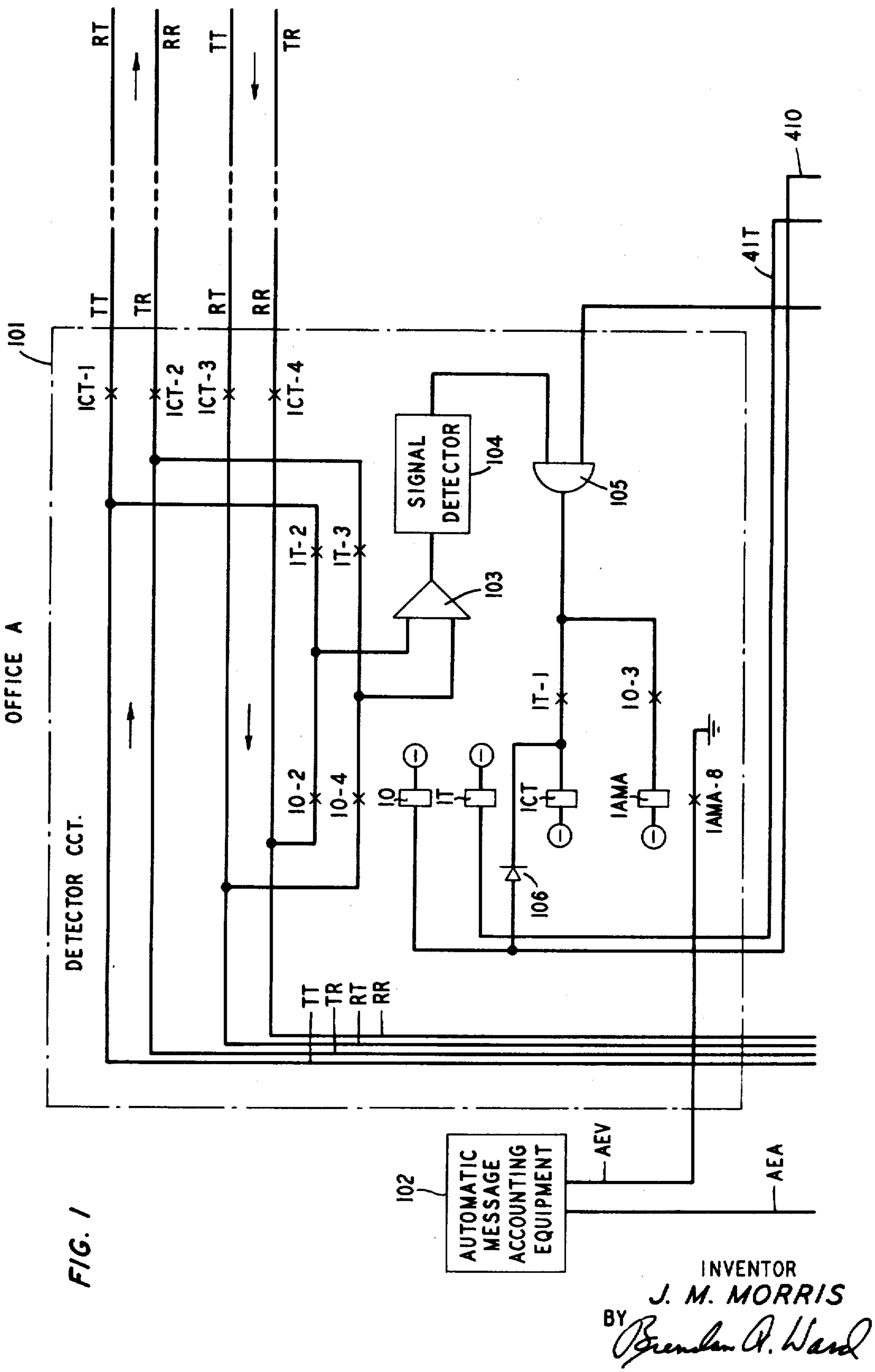
FIGS. 1 through 6 are combined schematic and block diagrams showing the interrelation of the exemplary embodiment of the invention.
Figure 2:
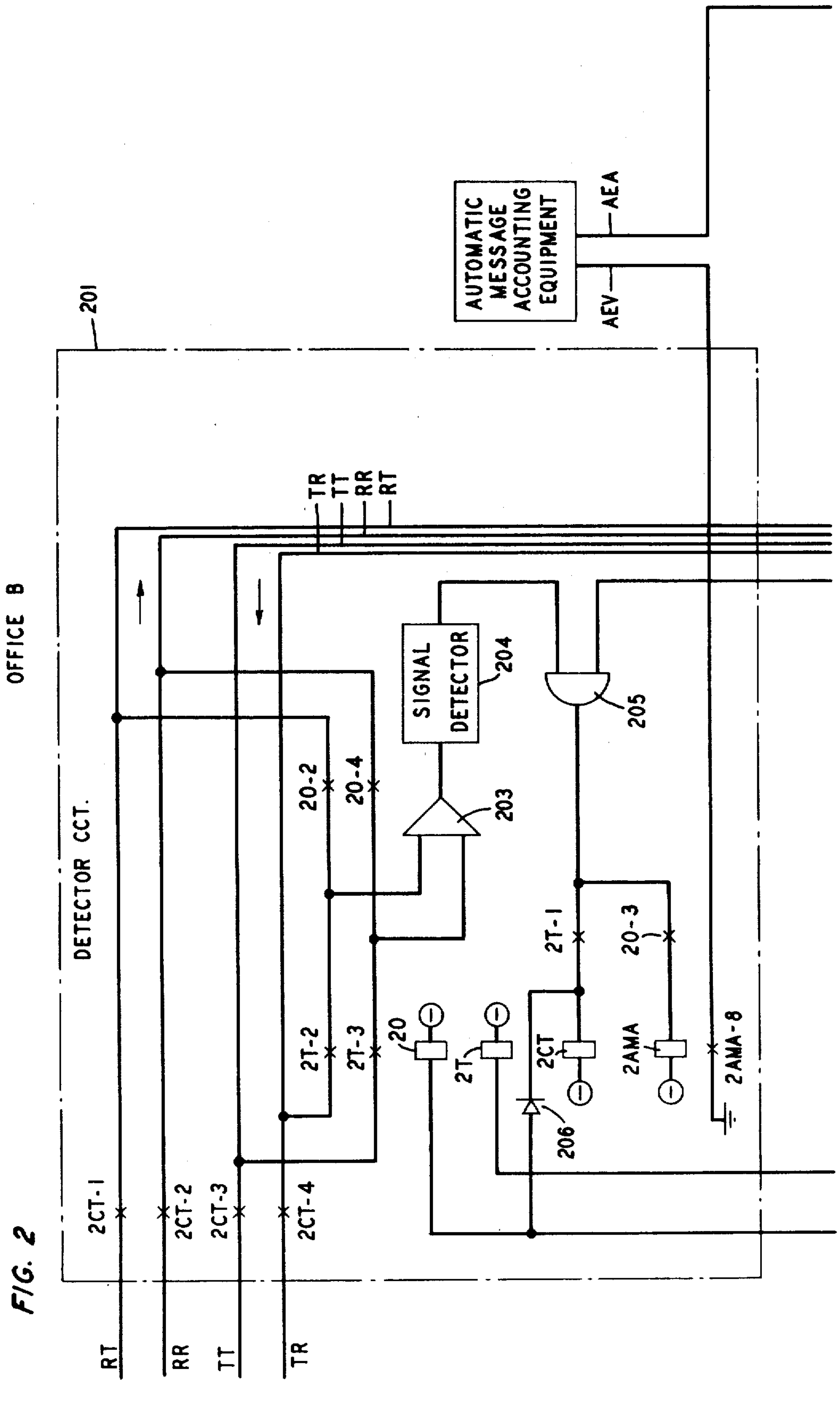

It will be noted that FIGS. 1, 2, 4, and 5 employ a type of notation referred to as "detached-contact" in which an "X", shown intersecting a conductor, represents a normally open contact of a relay, and a bar, shown intersecting a conductor at right angles, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, Volume 74, pages 505–513.

The present invention is illustrated in a combined wideband-voiceband switching system of the type set forth in the copending application of C. W. Haas Jr., Ser. No. 43,079, filed June 3, 1970. (See also copending application of M. C. Van Fossen et al., Ser. No. 9,691 filed Feb. 9, 1970.) The switching system incorporates two independently controlled crossbar switching networks respectively referred to as an audio network and a wideband network. The audio network is used for interconnecting telephone stations for voice communication, while the wideband network is used for providing wideband service, such as that required for video signals for visual communication. Thus, when a calling connection is initiated which is to provide both audio and video communication features the respective communication paths are concurrently established through both networks. However, it will be obvious from that which is contained hereinafter that the invention set forth herein is not limited to use in the system of the embodiment but may in fact be used in other systems.

In the illustrative embodiment, the switching system comprises two central offices respectively designated office A and office B. In order to simplify the disclosure, it is intended that each office is identical to the aforementioned Haas disclosure, except as set forth hereinafter. Thus, office A comprises a plurality of line link frames, such as line link frame 303, and a plurality of trunk link frames, such as trunk link frame 302. Each of these frames comprise a primary and a secondary switching stage. The conventional subscriber loops extending to telephone stations, such as subscriber loop L1 which extends to station S1, are connected to the primary switches on the line link frames, while communication circuits, such as two-way audio trunk 402, are connected to the primary switches of the trunk link frames. When actuated, the crossbar switches of the audio network provide a two-wire bidirectional transmission path between the telephone station and the communication circuit which have been selected for interconnection for a particular call.

The wideband network comprises wideband switching network frames, such as wideband line link frame 306, wideband junctor frame 305, and wideband trunk link frame 304. The subscriber loop extending from the central office to the station video apparatus, such as S1T at station S1, is extended via cable conductors, such as cable T1, to an appearance on a network switch of the wideband line link frame. The communication circuits, such as two-way video trunk 401, which provide the necessary wideband transmission capability and supervisory apparatus are terminated on a network switch on the wideband trunk link frames. Thus, the wideband network is operable to establish a four-wire transmission path extending from the cable conductors associated with the subscriber video apparatus, such as cable T1, to the video trunk which has been designated for interconnection on a particular call.

Only one marker circuit, such as marker and other common control circuit 301, is shown in block form in each office to simplify the drawing. It will be obvious to one skilled in the art that the marker comprises the necessary circuitry operable to perform those functions which are necessary to accomplish the interconnection of calling and called stations as above set forth. Therefore, except where necessary for a complete understanding of the invention, specific marker circuitry will not be discussed in detail herein. For a more complete description of a typical marker, the A. J. Busch U.S. Pat. No. 2,585,904 issued Feb. 19, 1952 may be consulted in conjunction with the earlier cited C. W. Haas Jr. disclosure.

It is also intended that the automatic message accounting equipment designated by circuit blocks 102 and 202 in offices A and B, respectively, shall be substantially identical to that set forth in the earlier cited U.S. patent issued to H. D. Cahill et al. As well known in the art, this equipment is operable to record the identities of the calling and the called stations and is further operable to record the initiation, duration and termination of a particular calling connection. In addition, this equipment is operable to receive and to record data indicating the appropriate message billing rate associated therewith for subsequent use in charging the calling station.

At each of offices A and B, detector circuits 101 and 201 are shown as respectively associated with a particular video trunk. As will be apparent from that which is contained hereinafter, each detector circuit is operable to cooperate with a two-way video trunk and a two-way audio trunk involved in a particular calling and called connection in order to attain the objects of the instant invention. Although the subject detector circuits are shown as independent circuit blocks interconnected with the other equipment of the embodiment, it will be obvious to those skilled in the art that in fact, the principles of my invention may be attained by assimilating the circuitry shown thereon or its equivalent within other circuits or apparatus of a communication system.

DETAILED DESCRIPTION

As earlier noted, the apparatus contained within the video and audio trunks of the embodiment is substantially identical to that which is set forth in detail in the earlier cited Haas application. In order to simplify the drawing, only that portion of the video and audio trunk apparatus which is necessary for a full understanding of the invention is shown herein. In this regard, certain relay contact designations within audio trunks 402 and 502 are shown enclosed by parentheses to indicate that the control paths for the associated relay windings are disclosed in the cited Haas disclosure. All other relay windings are assigned a designation which includes an initial digit identifying the figure number on which the control path is shown. Individual relay contacts are identified by the relay designation followed by the numerical number of the contacts (i.e. contacts 5IN-5).

Figures 3, 7:
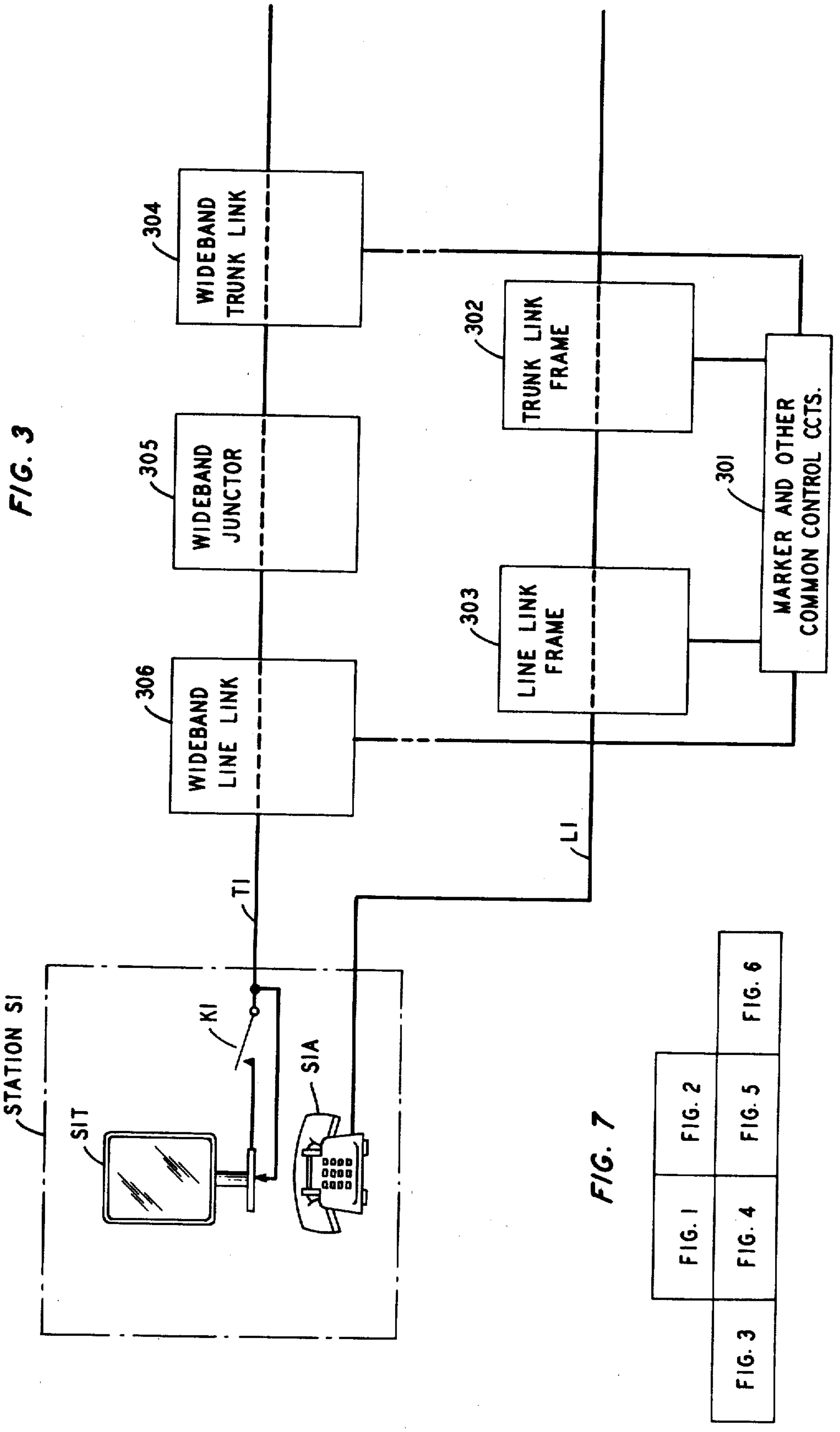
FIG. 7 shows the manner in which the other figures should be arranged.
Figure 6:
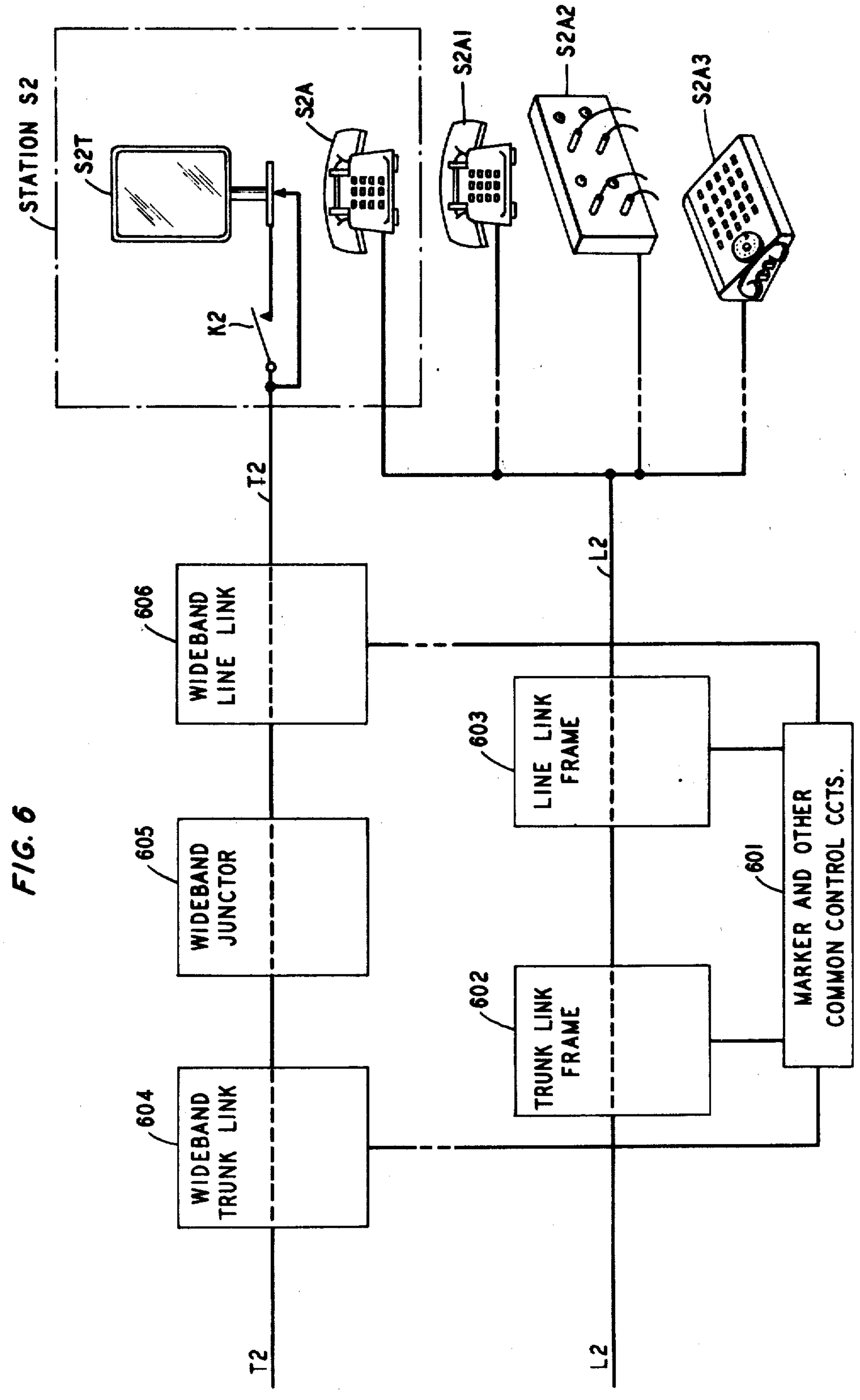

For purpose of the illustrative embodiment, we shall assume that station S1 (FIG. 3) directs the establishment of a communication path through to station S1 (FIG. 6), which communication path is to comprise both an audio channel and a video channel. We shall further assume that the subscriber at station S1 manifests such intention by prefixing an appropriate code indication to the transmitted directory number of station S2. Thus, the common control equipment, symbolically represented by marker and other common control circuit 301, establishes an audio connection which extends from subset S1A at station S1 via a selected audio linkage path through line link frame 303 and trunk link frame 302 to audio trunk 402 in office A. In similar fashion, marker and other common control circuits 301 establishe a four-wire wideband linkage path from video set S1T at station S1 through the enabling key K1 (which symbolically represents the enabling apparatus associated with video set S1T), via cable T1, and through a linkage path which extends from wideband line link frame 306, wideband junctor frame 305, through wideband line link frame 304 to the appearance of video trunk 401 in office A.

As a result of the selection of audio trunk 402, relays 4SG and 4S1 operate therein in a manner set forth in the cited Haas application. Ground is thus extended through enabled make contacts 4S1–2 and 4SG–2, and released break contact 4IN–2 and via 410 lead to the correspondingly designated lead of detector circuit 101 to complete the obvious operate path of relay 10 therein, thereby indicating that the audio and video trunks associated with detector circuit 101 are in the outgoing mode. Concurrently therewith, this ground signal is extended from lead 410 in detector circuit 101 through diode 106 to complete the obvious operate path of relay 1CT. The enabled state of relay 1CT closes make contacts 1CT–1 through 1CT–4 thereby extending the continuity of the TT, TR, RT, and RR leads from detector circuit 101 forward to detector circuit 201 in office B.

In a manner set forth in the cited Haas application, relays 4S and 4S1A are enabled in video trunk 401 via obvious circuits extending from audio trunk 402. The enabled state of make contacts 4S–1 through 4S–4 extends the continuity of the TT, TR, RT, and RR leads through video trunk 401 to the calling video set, or transceiver, S1T at station S1. The enabled state of make contact 4S1A–2 extends ground on the S lead from video trunk 401 to maintain the established linkage path to the wideband network. Concurrently therewith, relay 4VSS is enabled via a circuit extending through a released break contact on the (5F) relay in audio trunk 402. As a result, transfer contacts 4VSS–1 and 4VSS–2 are enabled thereby connecting video supervisory signal circuit 403 through to the RT and RR receive leads which extend to video set S1T. As set forth in detail in the earlier cited Haas application, video supervisory signal circuit 403 may comprise any number of configurations well known in the art operable to provide an electrical signal of predetermined waveform which is effective to turn on, or enable, the video circuitry withing video set S1T. Relay 4VSS remains operated for a brief interval and upon its restoration to normal, the continuity of the RT and RR leads from video set S1T is again extended through enabled make contacts 4S–1 and 4S–2 through video trunk 401 and detector circuit 101 to office B.

Since this is a call to a distant office, marker 301 selects a sender (not shown) and interconnects the sender with audio trunk circuit 402. In the well known-manner, the marker thereupon forwards the called directory number to the sender which will outpulse the number when the distant switching office is ready to receive it. The marker then proceeds to conduct various tests not pertinent to the instant invention prior to releasing to serve other calls.

At this time, in a manner not shown but which may advantageously be as set forth in the cited Cahill et al. patent, the automatic message accounting equipment 102 is enabled. As well known in the art, this equipment is operable to record the progress of the call and to provide a permanent record on tape for subsequent use in computing and printing subscriber's bills. For this purpose, three separate tape entries are made. The first entry includes all the required billing information (i.e., calling and called numbers) except the time for the beginning and the ending of the call; the second includes the time the connection is completed between stations; and the third entry includes the time the connection is terminated. Thus at this time we shall assume that in a manner well known in the art, automatic message accounting equipment 102 functions to cause an initail entry to be made.

Upon release of the marker, the connection is under control of the calling station S1 and the sender (not shown). The sender thereupon waits for the attachment of a register to the calling connection at the distant office.

Figure 4:
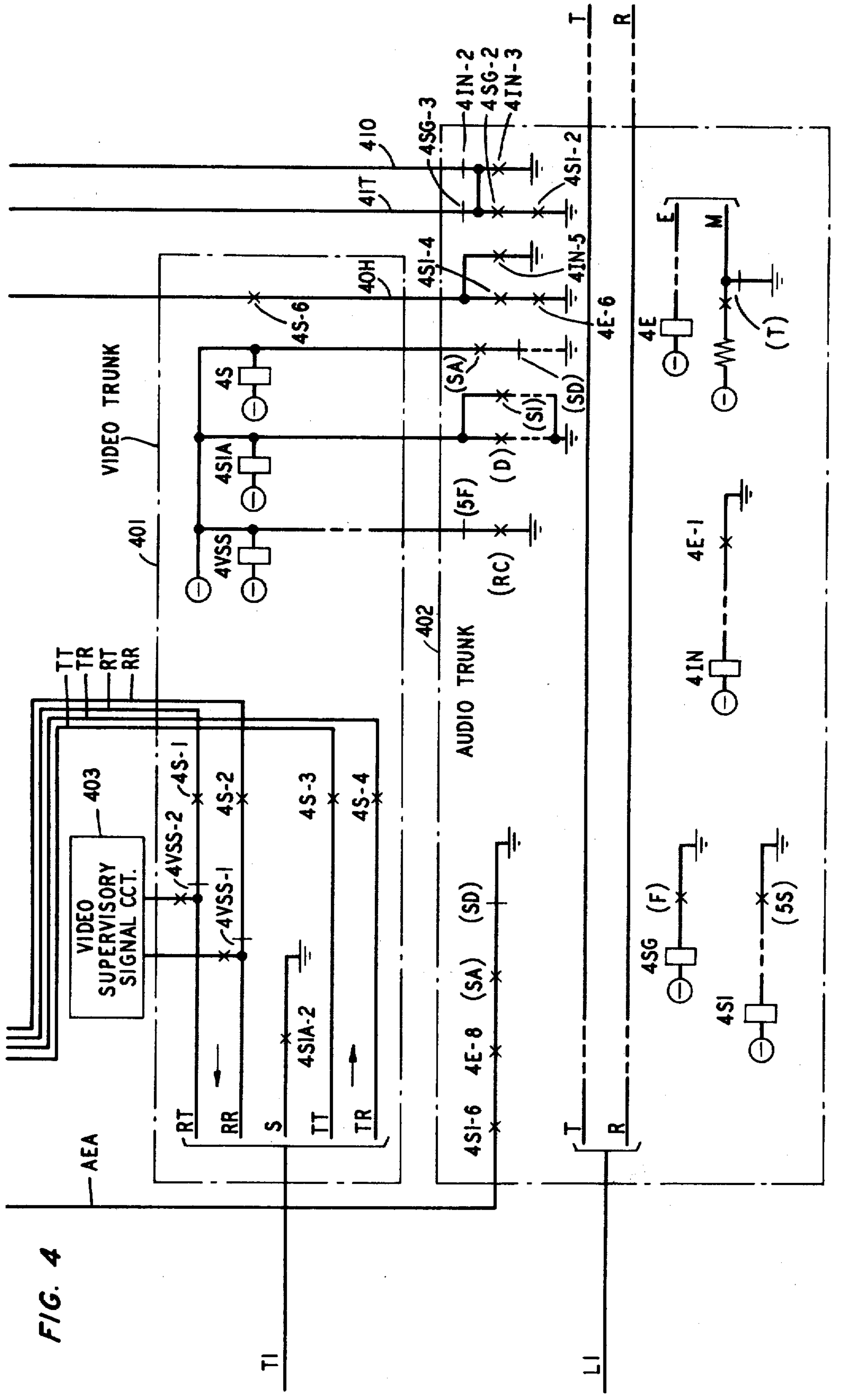
Figure 5:
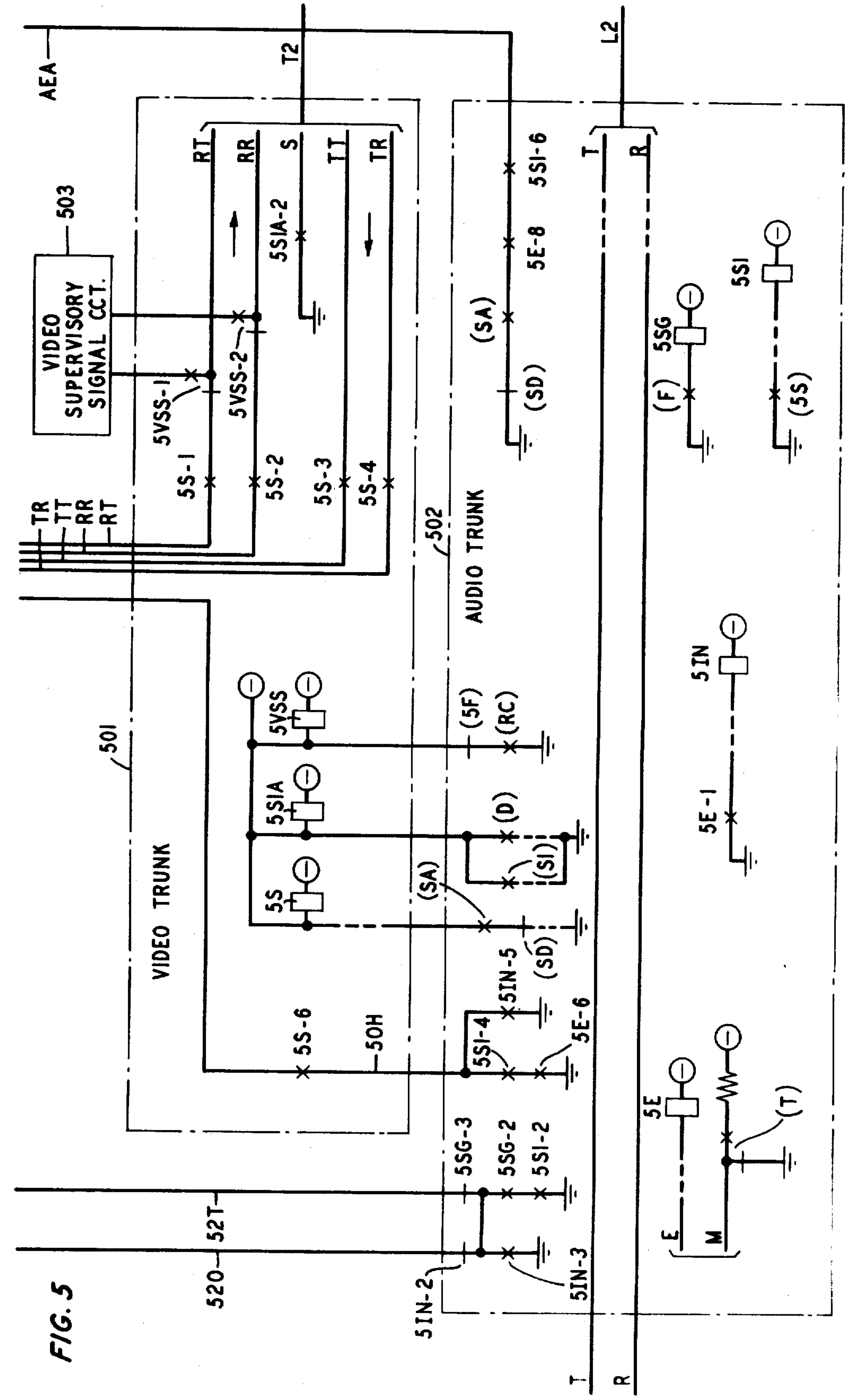

As noted earlier, the interconnecting trunk circuits at the called office B are identical to those shown within the calling office A. When audio trunk 402 if seized, relay (T) operates to connect battery to lead M in audio trunk 402. It will be noted that the audio trunk circuits which are shown in FIGS. 4 and 5 employ the well-known "E & M" type signaling, and thus battery on lead M is construed as an off-hook seizure signal. At office B, the seizure signal is received in the form of ground on the E lead of audio trunk 502. This causes relay 5E to operate thereby completing the obvious path of relay 5IN indicating an incoming call to audio trunk 502.

We shall assume that in a manner well known in the art, an incoming register (not shown) receives the called directory number which is thereupon transmitted from office A. We shall further assume that marker and other common control circuit 601 thereupon functions to extend an audio connection from audio trunk 502 through trunk link frame 602, line link frame 603 and via cable L2 to the called station.

It will be noted at this time that the conductors of cable L2 are shown as extending to a multiplicity of station subsets each of which are equipped only for audio communication. Thus, for example, the conductors of cable L2 extend to station subset S2A which we shall assume to be in physical proximity to video transceiver S2T which, in conjunction with each other, are operable to provide both an audio and a video communication path. Station S2A1, although identical in structure to subset S2A, represents a telephone extension via which an audio communication path may be established in an identical manner to that established to subset S2A. However, for purpose of discussion, it is assumed that subset S2A1 is at an extension location which is relatively remote from the location of subset S2A and is therefore also remote from video transceiver S2T.

Block S2A2 is shown to symbolically represent a telephone answering service system which is operable in the well-known manner to provide an alternative audio communication path for a call originally directed to subset S2A. In similar fashion, block S2A3 represents a call director which may be provided in a business office to provide screening of calls prior to such calls being completed through to a station comprising equipment such as transceiver S2T and subset S2A. It will also be noted that the operative, or inoperative state of transceiver S2T is determined by the position of key K2 which is under control of the subscriber at station S2. From the immediately foregoing discussion, it is obvious that, although the call, as initiated, is intended to result in the concurrent establishment of a visual as well as an audio connection, in fact, circumstances prevailing at the called station may prevent, or delay, the establishment of the visual connection even though the audio connection is initially completed. More specifically, the call may be initially answered at subset S2A1, telephone answering service system S2A2, or call director S2A3 thus providing only audio communication between the stations. In the alternative, the call may be answered from subset S2A, but with key K2 disabled because the subscriber chooses not to be a party to incoming video calls at this time.

Proceeding now with the circuit description, as earlier noted video trunk 501 is associated with audio trunk 502. Therefore, as set forth in the Haas application, upon the enabling of audio trunk 502, a linkage path is also extended from video trunk 501 through wideband trunk link frame 604, wideband junctor frame 605, wideband line link frame 606, and via cable T2 to switch K2 which, as earlier noted, is effective, when enabled, to render transceiver S2T operable for video purposes.

Upon seizure of audio trunk 502, relay 5IN operates as earlier set forth. Enabled make contact 5IN–3 extends ground through released break contacts 5SG–3 and via the 52T conductor from audio trunk 502 to complete the obvious operate path of relay 2T in detector circuit 201 thereby indicating that video trunk 501 is in a terminating mode in response to an incoming call. Enabled make contacts 2T–1 partially completes the operate path of relay 2CT in detector circuit 201 which extends to the output of AND gate 205. Concurrently therewith, the enabled state of make contacts 2T–2 and 2T—3 extend the TT and TR transmit leads of video trunk 501 through to the input of buffer amplifier 203 in detector circuit 201.

We shall assume that the calling connection is answered by subset S2A, and that video transceiver S2T is in an operable state at this time because of the previous enabling of switch K2. In response to the initial seizure of audio trunk 502, relay 5S1A in video trunk 501 is enabled thereby closing make contact 5S1A–2 to extend ground on the S lead to maintain the linkage connection extending through the wideband switching network of FIG. 6. Immediately thereafter, relay 5VSS in video trunk 501 is also enabled by an obvious circuit. The enabled state of transfer contacts 5VSS–1 and 5VSS–2 complete a circuit path extending from video supervisory signal circuit 503 to the RT and RR receive leads of video trunk 501, and thence through the aforedescribed wideband switching network linkage path to transceiver S2T to enable the video circuitry therein as earlier set forth. Deviating momentarily, as well known in the art, transceiver S2T is provided with logic circuitry (not shown) operable to recognize that the video supervisory signal has been received even though not utilized at the time because of previous disabling of the key K2. This permits immediate activation of the video apparatus upon subsequent activation of key K2 during the course of the call.

As described in the Haas application, relay (SA) operates in audio trunk 502 in response to the extension of the audio communication path from audio trunk 502 through to enabled subset S2A. The enabled state of make contacts of the (SA) relay in audio trunk 502 completes the obvious operate path of relay 5S in video trunk 501. Concurrently therewith, relay (RC) releases, thereby opening the operate path of relay 5VSS in video trunk 501.

Enabled make contacts 5S–1, through 5S–4 extend the RT and RR receive leads and the TT and TR transmit leads from station S2 through video trunk circuit 501 to detector circuit 201. The TT and TR leads are further extended within detector circuit 201 by the previously enabled make contacts 2T–2 and 2T–3 through to buffer amplifier 203. Thus, in view of the enabled state of transceiver S2T at station S2 a video synchronizing signal will be present on the aforedescribed TR and TT conductors at this time. This signal is detected by signal detector circuit 204 thereby enabling the upper terminal of AND gate 205. Concurrently therewith, ground is extended via enabled make contact 5IN–5, via conductor 50H, through the previously enabled make contact 5S–6 to enable the lower terminal of AND gate 205.

Summarizing at this time, the off-hook state of subset S2A has resulted in the enabling of relay 5S in video trunk 501 thus completing a circuit to the lower terminal of AND gate 205 to indicate the completion of an audio communication path. Concurrently therewith, the enabling of signal detector 204 indicates the existence of a continuous video communication path through to the called station. Thus, AND gate 205 is enabled in the well-known manner and completes the operate path of relay 2CT in detector circuit 201 which extends through enabled make contact 2T–1. The enabling of make contacts 2CT–1 through 2CT–4 thereupon extends the continuity of the RT and RR receive leads and the TT and TR transmit leads through detector circuit 201 to the corresponding detector circuit 101 in office A. It will thus be obvious that a continuous video and audio communication path now exists between transceiver S1T and subset S1A at station S1 and transceiver S2T and subset S2A at station S2.

Referring now to FIG. 4, in response to the completion of the calling audio connection through to the called subset S2A, answer supervision is returned to the calling office. Thus, lead E in audio trunk 402 has ground impressed thereon. Accordingly relay 4E operates, thereby recognizing the off-hook state of the called station telephone subset. The enabling of make contact 4E–6 extends ground through enabled make contact 4S1–4 in audio trunk 402, via lead 40H to video trunk 401, and through enabled make contacts 4S–6 to provide an input to the lower terminal of AND gate 105 thereby indicating audio answer by the called station at the remote office. Concurrently therewith, the enabled state of make contact 4E–8 extends ground through to the AEA lead of audio trunk 402 which extends to automatic message accounting equipment 102 to thereby cause an audio answer entry to be made at this time in the well-known manner. This entry is thus the second entry made in connection with this call for charging purposes. Obviously, if the instant call were intended to provide only voice communication, then one entry would remain to be made, namely a disconnect entry as earlier set forth. As will be apparent from that which is contained hereinafter, if the call were not answered from transceiver S2T the automatic message accounting data would consist merely of an initial entry, and audio answer entry, and a disconnect entry thereby resulting in a suitable charge in accordance therewith. However, since we have assumed that the call, in fact, consists of a completed video as well as an audio connection, an additional entry is made to reflect the video feature, as explained below.

The enabling of make contacts 2CT–1 through 2CT–4 in detector circuit 201 extends the video supervisory signal present on the TT and TR leads from transceiver S2T via detector circuit 201 to the RT and RR conductors of detector circuit 101 from which point the signal is extended through to transceiver S1T to cause synchronization of the respective video apparatus as earlier described. This signal is also extended via enabled make contacts 10–2 and 10–4 to buffer amplifier 103 and via signal detector 104 to enable the upper terminal of AND gate 105 to thereby provide indication of the completion of the video connection through to enabled video apparatus at the called station. In view of the enabled state of the upper and lower terminal of AND gate 105, the gate operates and thus completes the obvious operate path of relay 1AMA which extends through the previously operated make contact 10–3.

The enabled state of make contacts 1AMA–8 extends ground to the AEV lead of detector circuit 101 which extends to automatic message equipment 102 to thereby cause a video answer entry to be made in a manner substantially identical to that earlier set forth for the audio answer entry. It will, of course, be obvious that in the instant example the video answer entry occurs an extremely brief interval of time after the audio entry earlier set forth. It is also obvious that this brief interval of time would in all probability be insufficient to cause any real distinction in the charging rate since for all practical purposes both entries are almost concurrent. Thus when the aforesaid entries are processed for purposes of computing the necessary billing data, the processor will recognize that the call constituted the concurrent completion of an audio connection and a video connection through to a called station. As well known in the art, the actual amount of the charge which would be levied will be ascertained based upon the final entry made in automatic message equipment 102. This final entry occurs in a manner not shown but which is well known in the art and may advantageously be as set forth in the cited Cahill patent. This final entry is known as the disconnect entry and occurs upon release from the connection of the equipment at stations S1 and S2.

From the foregoing description it is clear that in the event the calling connection was not completed through to transceiver S2T for any reason such as those earlier enumerated, the operate path of relay 1AMA would not have been completed and accordingly, video answer entry would not have taken place. Thus, even though the calling station S1 had directed the completion of an audio connection and a video connection through to called station S2, station S1 would be billed only for the communication feature which was in fact employed during the interval of the connection. It is also obvious from that which is set forth earlier herein that in fact the calling connection may have been answered by a telephone subset, such as subset S2A1, thereby resulting in an audio answer entry occurring as earlier described, followed by a video answer entry occurring at a substantially later point in time upon the extension of the video connection through to enabled transceiver S2T. When this latter condition prevails, automatic message equipment 102 will have recorded in a manner well known in the art the fact that the video communication feature was utilized for a portion of the interval of time during which the audio connection was in existence, thereby readily permitting appropriate billing of the calling station S1 to occur.

While the equipment of my invention has been shown in an embodiment wherein a communication system is provided which is operable to establish a communication path comprising a video connection and an audio connection between stations and which is further operable to detect the enabling of either or both said connections and is further operable to control automatic message equipment to record the completion and duration of each such connection, it will be obvious to those skilled in the art that numerous other arrangements may be made without departing from the spirit and scope of my invention. For example, my invention may be employed in switching systems which are operable to interconnect data processing equipment which is capable of selecting various communication features for selected intervals of time during the course of a particular connection.

Another example would be where a system is arranged not only to indicate and record the initiation of a given feature during the course of a connection but which is further operable to record the cessation of the use of that feature at a point in time prior to the termination of the use of such connection.

What is claimed is:

1. In a switching system, a calling station, a called station, means controlled by said calling station for establishing a basic communication path between said stations and for rendering operable means for providing a communication service feature associated with said basic communication path and arbitrarily selectable by said called station, first means for detecting the enabling of said communication path, second means for detecting the enabling of said communication service feature, and means controlled by said first means and said second means for recording the completion and duration of said communication path and the enabling of said communication service feature.

2. In a communication system,
a plurality of stations,
means for concurrently establishing a communication path comprising a plurality of independent communication channels from a calling said station to a called said station,
a plurality of means controlled by said called station each operable to enable one of said communication channels,
means for detecting the operative state of each of said enabling means, and
means controlled by said detecting means for recording the completion of any of said enabled communication channels.

3. In a switching system,
a plurality of stations,
means for establishing a wideband connection and an audio connection from a calling said station to a called said station,
first means at said called station for enabling said audio connection,
second means at said called station for enabling said wideband connection,
means for detecting the operative state of said first means and said second means, and
charging means controlled by said detecting means for recording the completion and duration of said audio connection and the completion of said wideband connection.

4. In a telephone system,
a plurality of central offices,
a calling station at a first said central office,
a called station at another said central office,
means at said first central office for establishing a video communication path from said calling station to said other central office,
means at said first central office for establishing an audio communication path from said calling station to said other central office,
means at said other central office for extending said video path to said called station,
means at said other central office for extending said audio path to said called station,
first means at said called station for enabling said audio communication path,
second means at said called station for enabling said video communication path,
means for detecting the operative state of said first means,
means for detecting the operative state of said second means, and
charging means controlled by both said detecting means for recording the completion of each of said communication paths.

5. In a telephone system, the combination set forth in claim 4 wherein said means for establishing a video communication path and said means for establishing an audio communication path are concurrently enabled in response to signals from said calling station.

6. In a telephone system, the combination set forth in claim 4 wherein said means for establishing a video connection to said other central office comprises first trunk means at said first central office serially inserted in said video connection,
said means for establishing an audio connection to said other central office comprises second trunk means at first central office serially inserted in said audio connection,
said means for extending said video connection comprises third trunk means serially inserted in said extended video connection,
said means for extending said audio connection comprises fourth trunk means serially inserted in said extended audio connection,
said means for detecting the operative state of said first means is operatively associated with said second and said fourth trunk means, and
said means for detecting the operative state of said second means is operatively associated with said first and said third trunk means, 7. In a telephone system, the combination set forth in claim 6 further comprising means for maintaining said extended video communication path in an open circuit state, and means controlled by the enabling of both said detector means for disabling said maintaining means.

8. In a telephone system,
a plurality of central offices,
a calling station at a first said central office,
automatic message accounting means at said first central office,
a called station at another said central office,
means at said first central office controlled by said calling station for establishing a video communication path, comprising a first video trunk, and an audio communication path, comprising a first audio trunk, from said calling station to said other central office,
means at said other central office comprising a second video trunk for extending said video communication path to said called station,
means at said other central office comprising a second audio trunk for extending said audio communication path to said called station,
first means at said called station for completing said audio communication path,
second means at said called station for completing said video communication path,
means operatively associated with said second audio trunk for detecting the operative state of said first means,
means operatively associated with said first audio trunk and controlled by said second audio trunk detecting means for enabling said automatic message accounting means,
means operatively associated with said second video trunk for detecting the operative state of said second means, and
means operatively associated with said first video trunk and controlled by said second video trunk detecting means and said first audio trunk automatic message accounting enabling means for reenabling said message accounting means.

9. In a telephone system, the combination set forth in claim 8 wherein said first means comprises a plurality of station subsets connected in parallel and
said second means comprises enabling apparatus operatively associated with at least one video transceiver.

10, In a telephone system, the combination set forth in claim 9 wherein said video transceiver comprises means for transmitting an electrical signal of predetermined waveform via said completed video communication path, and said detecting means operatively associated with said second video trunk comprises means for recognizing said electrical signal.

11. In a telephone system, the combination set forth in claim 10 further comprising means for maintaining said completed video communication path in an open state, and means controlled by said recognizing means and said detecting means operatively associated with said second audio trunk for disabling said maintaining means.

12. In a switching system comprising accounting means, a calling station, a called station, means controlled by said calling station for concurrently establishing a first communication path and a second communication path from said calling station to said called station, first means at said called station for enabling said first communication path and second means at said called station for enabling said second communication path, the combination comprising third means for detecting the operative state of said first means, fourth means for detecting the operative state of said second means, means controlled by said third means for enabling said accounting means to record the completion and duration of said first communication path, and means controlled by said third and fourth means for enabling said accounting means to record the completion of said second communication path.

* * * * *